United States Patent [19]

Sumi

[11] Patent Number: 4,763,150
[45] Date of Patent: Aug. 9, 1988

[54] MOTOR-BUILT-IN PHOTOGRAPHIC LENS

[75] Inventor: Akiyasu Sumi, Kanagawa, Japan

[73] Assignee: Canon Kabushiki Kaisha, Tokyo, Japan

[21] Appl. No.: 122,584

[22] Filed: Nov. 17, 1987

Related U.S. Application Data

[63] Continuation of Ser. No. 678,388, Dec. 6, 1984, abandoned, which is a continuation of Ser. No. 437,017, Oct. 27, 1982, abandoned.

[30] Foreign Application Priority Data

Nov. 4, 1981 [JP] Japan ................................. 56-176664

[51] Int. Cl.[4] .............................................. G03B 9/06
[52] U.S. Cl. .................................. 354/271.1; 354/274
[58] Field of Search ................... 354/270, 271.1, 272, 354/274, 234.1

[56] References Cited

U.S. PATENT DOCUMENTS

| 3,687,042 | 8/1972 | Mizui et al. | 354/234 |
| 4,005,448 | 1/1977 | Iwata et al. | 354/234 X |
| 4,113,359 | 9/1978 | Koike et al. | 354/271 X |
| 4,327,977 | 5/1982 | Starp | 354/271 X |
| 4,334,748 | 6/1982 | Stacklies et al. | 354/271 X |
| 4,408,858 | 10/1983 | Lee | 354/271.1 |
| 4,460,253 | 7/1984 | Kawai et al. | 354/271.1 |

Primary Examiner—Michael L. Gellner
Attorney, Agent, or Firm—Toren, McGeady & Associates

[57] ABSTRACT

In the disclosed lens where the size of the diaphragm aperture is determined by the opening and closing movement of a plurality of blades, the movement is carried out by a stepping motor. A rotor and a stator of the motor are built into the diaphragm, and a magnet of plastic material is used as the permanent magnet for the motor rotor.

4 Claims, 3 Drawing Sheets

MOTOR-BUILT-IN PHOTOGRAPHIC LENS

This is a continuation of application Ser. No. 678,388, filed Dec. 6, 1984, which in turn is a continuation of application Ser. No. 437,017, filed Oct. 27, 1982 both abandoned.

BACKGROUND OF THE INVENTION

1. Field of the Invention

This invention relates to photographic lenses having a motor therein, and more particularly to a technique of moving the diaphragm blades stepwise by a stepping motor.

2. Description of the Prior Art

Mechanical devices for operational control of a diaphragm device in a lens barrel have found wide acceptance.

Such a structure has, as illustrated in FIG. 1, two pivot pins on one end of each of a plurality of diaphragm blades. Only one of the diaphragm blades is shown. One of the pair of pins is rotatably fitted in a stationary portion (not shown) of the diaphragm device, and the other is freely fitted in an elongated slot 2a of a control member 2. The control member 2 has an axially extending arm portion 2b and is arranged to be rotatable relative to the aforesaid stationary portion, so that when the aforesaid arm portion 2b turns about the optical axis, as the pivot pins move in their respective slots, the diaphragm blades are caused to pivot to change the size of opening.

The control mode for determining the exposure, may be either the aperture priority and shutter time priority mode. In either of these control modes, the various factors for the exposure such as object brightness, film sensitivity, shutter time and aperture value are electrically processed by a computer system.

Present and future control systems for cameras are expected to employ electrical control as the method for meeting the demand for increased speed and accuracy.

But presently such electrical controls are located in the camera body, rather than in the lens. Proposals for incorporating an automatic focusing device in the photographic lens and for motorizing the zoom lens have been made. The conventional photographic lenses with motors built in are not compact, as they employ an ordinary motor and a drive connection which includes a gear train beween the output shaft of the motor and the movable member of the photographic lens.

It is known to build an electromagnetic drive into the diaphragm device for driving and controlling the diaphragm blades as, for example, in U.S. Pat. No. 3,687,042.

These diaphragm devices increase the number of constituent parts common to the diaphragm device and the electromagnetic mechanism. Thus, the device as a whole is increased in complexity, bulk and size.

SUMMARY OF THE INVENTION

An object of the present invention is to use a step motor in controlling the operation of a diaphragm device. A drive member for driving the diaphragm blades in stepwise fashion is driven by the permanent magnet of the motor. A photographic lens with the stepping motor built in the diaphragm device is also provided.

Another object of the present invention is to provide a photographic lens in which the permanent magnet can be drivingly connected to the diaphragm blades by simple means such as a permanent magnet; and wherein the permanent magnet is made of plastic material.

DESCRIPTION OF THE PREFERRED EMBODIMENTS

The present invention will next be described in greater detail in connection with embodiments thereof by reference to the drawings.

Figure 1:
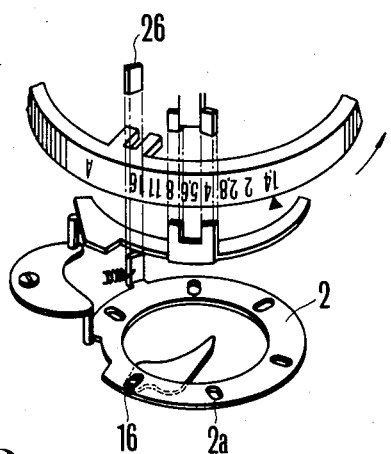
FIG. 1 is a perspective view of the main parts of a conventional diaphragm device.
Figure 2:
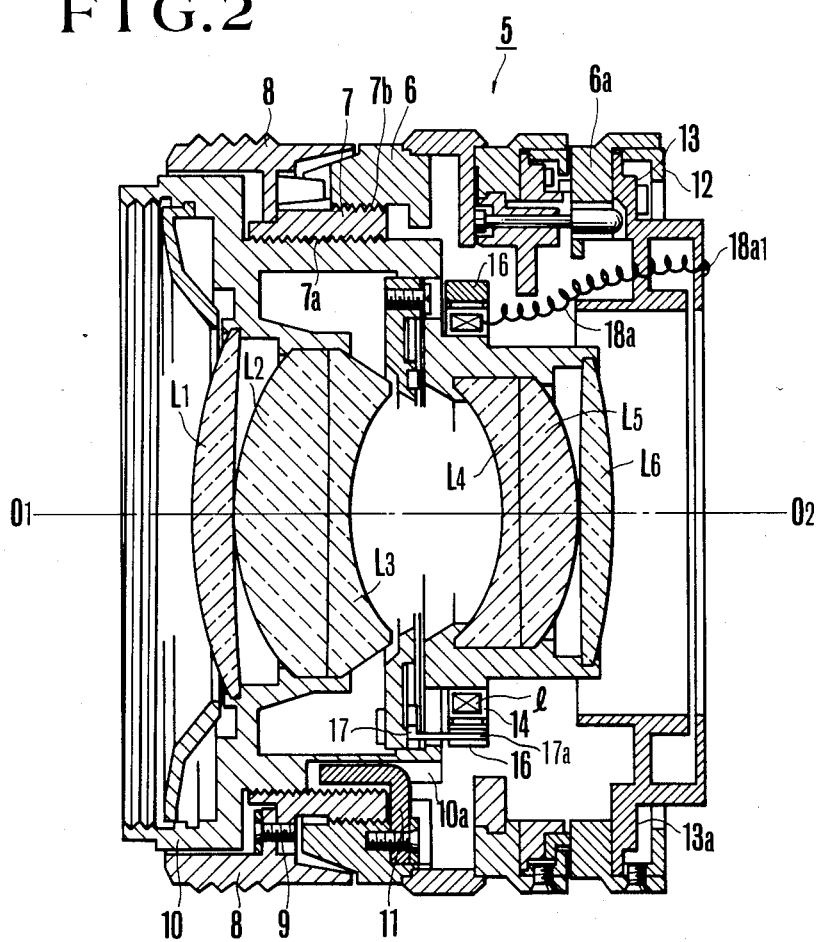
FIGS. 2 to 6 illustrate an embodiment of the present invention with FIG. 2 being a sectional view of a lens mounting mechanism employing the diaphragm device of the invention as applied to an interchangeable objective lens, FIG. 3A illustrating a cross sectional view of a part of the motor portion, FIG. 3B being a slanted view of the motor portion, FIG. 4 being a perspective view of a ring-shaped permanent magnet, FIG. 5 illustrating a drive connection between the permanent magnet and a control member, and FIG. 6 being an electrical circuit diagram.

The first embodiment is described as applied to an interchangeable objective lens for a single lens reflex camera. In FIG. 2, numeral 6 denotes a fixed barrel of a lens mounting which is generally indicated at 5. A double-helicoid sleeve 7 has helicoids 7a and 7b in the inner and outer peripheries, and engages corresponding threads in the fixed barrel 6. Member 8 is a focusing actuator member fixed to the aforesaid sleeve 7 by a screw fastener 9 and fitted in between the fixed barrel 6 and a movable lens holder framework 10. The movable lens holder framework 10 threadedly engages the aforesaid helicoid sleeve 7, carries lens elements L1 and L6 for focus adjustment and image formation.

Machined in the aforesaid movable lens holder framework 10 is a longitudinal groove 10a parallel to optical axis 01-02 into which is engaged a key member 11 fixed to the stationary barrel 6.

At one end 6a of the fixed barrel 6 there is shown a coupling member 12 (of the bayonet type or the like) for attachment to a camera body. Numeral 13 denotes a mount member mounted in a hollow cylindrical portion of the fixed barrel 6a to be rotatable relative thereto and restrained from axial movement. The mount member 13 has a reference shoulder or fitting portion 13a adapted to engage a fitting portion on the camera body when the aforesaid coupling member tightens against a coupling member (not shown) on the camera body. The mount member 13 is held stationary relative to the camera body when the lens 5 is attached to and detached from the camera body. The constructional relationship between the aforesaid fixed barrel 6 and the mount member 13 may be in the form disclosed in the specifications of U.S. Pat. Nos. 4,230,403 and 4,317,627 assigned to the assignee of the present invention.

Mounted on the outer periphery of the movable lens holder member 10 is a stepping motor. An adequate number of field coils (l1–ln) turning on iron cores are fixedly placed on the outer periphery of the movable lens holder member 10, and a permanent magnet 16 is arranged on the outer periphery of a field yoke 14 through ball bearings 15a and 15b.

Figure 3A:
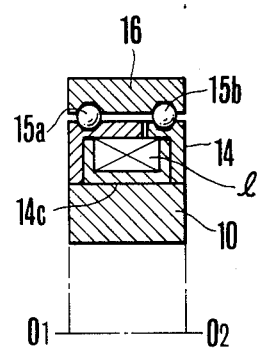
Figure 3B:
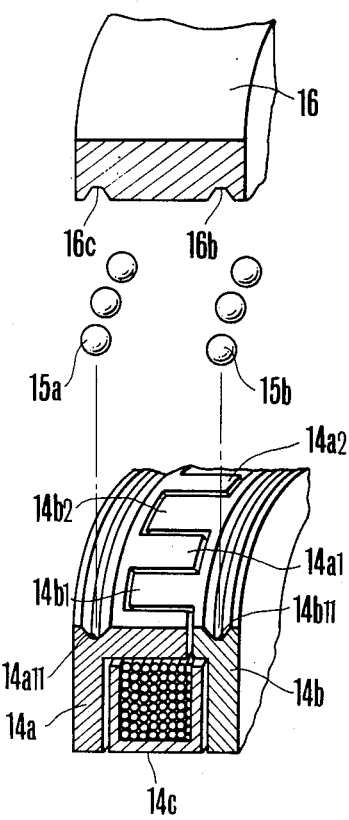
Figure 4:
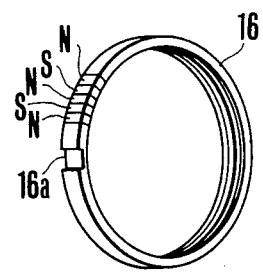

FIG. 3A is a sectional view illustrating the relationship of arranging coils 1, yoke 14, ball bearings 15a and 15b and permanent magnet 16 of the stepping motor on the outer periphery of the movable lens holder member 10. The permanent magnet 16 is formed as illustrated in FIG. 4 to a ring-like shape by a plastic material with the S and N poles of radial direction alternating in the circle of the ring. The ring 16 is provided with a longitudinal groove 16a. A control member 17 on which are carried pivot pins for the diaphragm blades, is mounted for rotation about the optical axis of the aforesaid movable lens holder member, and its arm 17a engages in the longitudinal groove 16a of the aforesaid permanent magnet 16. The field yoke 14, as shown in FIG. 3B, comprises two yoke rings 14a, 14b each prepared by stamping and having an L-shaped cross section, with mutually engageable segmental teeth $14a1, 14a2 \ldots$, $14b1, 14b2 \ldots$ respectively.

Around the outer circumferences the stems of the segmental teeth of the yoke rings 14a, 14b, there are formed guide grooves 14a11, 14b11 containing ball bearings 15a, 15b. The numerical reference 14c represents a holding member for the field coil 1 having U-shaped cross section. The permanent magnet 16 may be formed in a single ring, or formed by a plurality of arched portions mutually connected into a ring, and around the inner circumference of the ring there are formed guide grooves 16c, 16b for the ball bearings 15a, 15b.

In FIG. 2, member 18a is a lead wire for current supply to the aforesaid field coils 11–14, the lead wire 18a having passed through a hole provided in the wall of the aforesaid mount member 13 being connected to a terminal 18a1 provided at point in position to touch a complementary electrically conductive terminal provided on the fitting surface or the like of the camera body.

Figure 6:
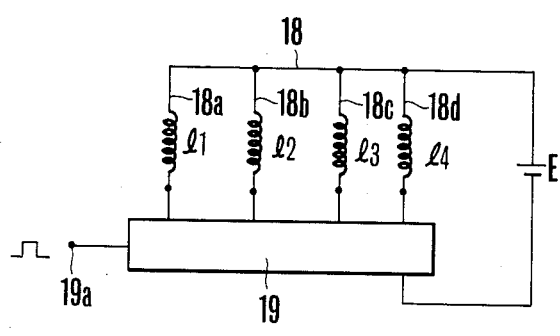

The lead wird 18a is provided for connection to each of the field coils 11–14 arranged on the outer periphery of the lens holder member as illustrated in FIG. 6 where 19 is a ring counter and E is an electrical power source or battery in the same camera body.

The operation of the device of such construction is as follows:

When a pulse signal of the form illustrated in FIG. 6 is applied to an input terminal 19a of the ring counter 19, the field coil 11 is connected with the battery E, so the field yoke of the coil 11 is magnetized. As the one of the permanent magnet pieces in the ring 16 which confronts the yoke of the coil 11 is an S pole, when the yoke produces an S pole, they repel each other, and the magnetized yoke attracts the N pole of the adjacent piece of the permanent magnet 16, thereby the annular permanent magnet 16 is turned about the optical axis 01–02. Responsive to advent of successive pulses on the input terminal 19a of the ring counter 19, the ring counter 19 energizes the field coils 11–14 successively and the permanent magnet 16 rotates about the optical axis a number of steps depending upon the number of pulses applied to the ring counter 19.

Figure 5:
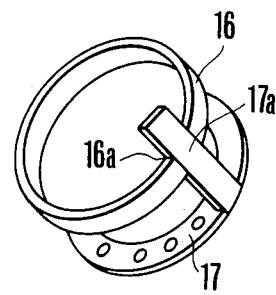

Such rotation of the permanent magnet 16 is transmitted to the control member 17 through the drive connection of its arm 17a illustrated in FIG. 5, causing the control member 22 to turn about the optical axis by a corresponding angle. As a result, the diaphragm blades are moved to form an aperture opening of which the size is controlled by the angle of rotation of the control member 17.

Figure 7:
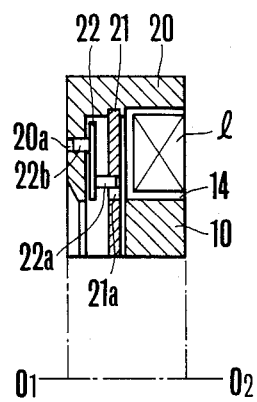
FIGS. 7 and 8 illustrate another embodiment of the present invention, with FIG. 7 being a fragmentary sectional view of the motor portion, and FIG. 8 being a perspective view of the ring-shaped permanent magnet.
Figure 8:
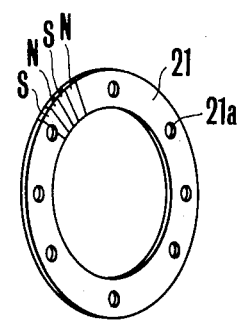

FIGS. 7 and 8 illustrate another embodiment of the present invention. In this embodiment, the aforesaid movable lens holder member 10 supports the field coils 11–14 and the yokes 14. Numeral 20 denotes a holding member for a rotor 21, the holding member being fixed to the lens holder member 10. The rotor 21 as illustrated in FIG. 8 is a permanent magnet of thin ring-like shape made up of plastic material and magnetized to alternating S and N poles of radial direction. The rotor 21 is rotatably fitted in a circumferential groove formed in the inner diameter of the aforesaid holding member 20. Numeral 22 denotes a diaphragm blade. The diaphragm blade 22 carries two pivot pins 22a and 22b, of which, the pin 22a, is freely fitted in a hole 21a formed in the aforesaid ring-like permanent magnet 21, and the other of which, the pin 22b, is fitted in a hole 20a provided in the aforesaid holding member 20.

With the device of FIGS. 7 and 8, when the field coil 1 is supplied with current, the permanent magnet 21 turns about the optical axis by the attracting and repelling action between the magnetic pole formed in the yoke 14 and each magnetic pole of the permanent magnet 21. Thus the diaphragm blade 22 is turned about the pivot pin 22b to form an aperture opening as the number of diaphragm blades is plural.

As described above, the present invention is either to apply the driving force of the motor (step motor) to the control member 17 for rotation of the diaphragm blades pivotally mounted within the lens barrel, or to replace said control member directly by the rotor 21 of the motor so that the pivotal movement and angle of rotation of the diaphragm blades are controlled to determine the size of aperture opening. According to the present invention, the amount of movement of the diaphragm blades can be controlled by the electrical signal, thereby making it possible to control exposure with increased accuracy.

It is to be noted that in application of the present invention to another type of diaphragm where the diaphragm blades are driven to move from the maximum possible aperture position to the minimum, requires that a bias spring is connected to the arm 17a of the control member 17 so that the permanent magnet 16 turns in a direction to close down the diaphragm aperture against the bias spring.

In the present invention, the diaphragm blades are driven directly by the rotor constituting a part of the stepping motor, or indirectly through the control member 17. Therefore, an advantage is produced in that there is no loss of driving energy, and the device operates with high efficiency. Another advantage arising from the utilization of the rotative force of the rotor of the step motor in moving the diaphragm blades is that there is no need to provide an intermediary between the motor and the diaphragm blades, and therefore the number of constituent parts is lessened. This minimizes the possibility of faulty operation and yields a diaphragm device of low cost.

What I claim is:

1. An arrangement for operating a diaphragm device within a lens barrel having an optical axis comprising:
 a stepping motor including a plurality of ring-shaped field yokes each having pole teeth extending substantially parallel to the optical axis and spaced relative to the teeth of another yoke;
 a plurality of field coils fixedly mounted on said yokes;

a ring-like permanent magnet positioned on the outer periphery of said yoke and rotatable stepwise relative to said yoke of energization of said field coils;

said ring-like permanent magnet being made of plastic magnetic material;

a diaphragm blade operating member arranged for operating diaphragm blades of the diaphragm device;

a drive connection for transmitting stepwise rotation of said ring-like permanent magnet to said diaphragm blade operating member; and said drive connection having a guide groove formed in said ring-like permanent magnet and an arm extending from said operating member, said arm being engageable with said guide groove to integrally connect said permanent magnet and said operating member.

2. A lens barrel, having a diaphragm unit, comprising:

(a) a yoke construction having an aperture through which light passes, said yoke construction being formed in a substantially cylindrical shape and having a magnetic pole region provided at a peripheral surface;

(b) a magnetic rotor having an aperture through which light passes, said magnetic rotor being formed in a cylindrical shape with a plastic magnet and being so provided to overlap said yoke construction in a radial direction, wherein a magnetized region of said magnetic rotor is formed with N-poles and S-poles alternatingly positioned at a peripheral surface of said magnetic rotor opposite to said magnetic pole region of said yoke construction;

(c) an exciting coil assembled to said yoke construction for receiving a supply of current and causing said yoke construction to generate electromagnetic power for driving said magnetic rotor;

(d) said diaphragm unit being drivenly connected to said magnetic rotor; and (e) bearing means having a plurality of bearing balls for rotatably supporting said magnetic rotor, said bearing balls being supported by a receiving groove directly molded in a peripheral surface of said magnetic rotor and in a peripheral direction, wherein said receiving groove is formed at the peripheral surface of said magnetic rotor opposite to said yoke construction and at such a position as deviating in a radial direction from said magnetic pole region of said yoke construction.

3. A lens mounting according to claim 2, wherein said magnetic rotor further comprises a groove formed directly therein by molding for connection with said diaphragm unit, said groove being formed in a radial direction of said magnetic rotor.

4. A lens barrel which comprises a yoke construction having an aperture through which light passes, a magnetic rotor having an aperture through which light passes, and an exciting coil being assembled to said yoke construction for receiving a supply of current and causing said yoke construction to generate electromagnetic power for driving said magnetic rotor, and for driving a diaphragm unit built therein in response to a rotation of said magnetic rotor, wherein:

(a) said diaphragm unit at least includes:

(a-1) a plurality of diaphragm blades each having first and second pivot pins mounted at deviated positions on opposing planes thereof;

(a-2) a fixed member for supporting each of said first pivot pins at one of said opposing planes of said plurality of diaphragm blades and enabling said diaphragm blades to swing about said first pivot pins, said fixed member having an aperture through which light passes; and (b) said magnetic rotor being formed by molding with a plastic magnet and having a groove which is formed simultaneously by said molding, said magnetic rotor having each of said second pivot pins at the other of said opposing planes of said plurality of diaphragm blades inserted therein, wherein said plurality of diaphragm blades swing in response to a rotation of said magnetic rotor for varying a diaphragm aperture formed by said diaphragm blades.

* * * * *